(12) United States Patent
Bruins et al.

(10) Patent No.: US 7,207,095 B2
(45) Date of Patent: Apr. 24, 2007

(54) PROCESS FOR FORMING ELONGATED FLEXIBLE STRIP OF NAILING CAPS

(75) Inventors: Roger C. Bruins, Hudsonville, MI (US); Roger A. Vanden Berg, Jamestown, MI (US)

(73) Assignee: National Nail Corporation, Grand Rapids, MI (US)

( * ) Notice: Subject to any disclaimer, the term of this patent is extended or adjusted under 35 U.S.C. 154(b) by 0 days.

(21) Appl. No.: 10/858,236

(22) Filed: Jun. 1, 2004

(65) Prior Publication Data

US 2005/0265807 A1 Dec. 1, 2005

(51) Int. Cl.
*B29C 65/56* (2006.01)
*B65D 85/671* (2006.01)

(52) U.S. Cl. .............. 29/453; 29/527.1; 264/249; 411/442; 206/343

(58) Field of Classification Search ........ 411/442–445; 206/343–347; 29/453, 525, 527.1; 264/249, 264/297.2, 297.8; 470/41, 162; 24/DIG. 41
See application file for complete search history.

(56) References Cited

U.S. PATENT DOCUMENTS

| | | | | |
|---|---|---|---|---|
| 2,366,510 | A | * | 1/1945 | Frank .................... 411/445 |
| 4,576,591 | A | * | 3/1986 | Kaye et al. ............... 604/62 |
| 4,586,609 | A | * | 5/1986 | Won .................... 206/343 |
| 4,801,064 | A | * | 1/1989 | Mangone, Jr. ........... 227/120 |
| 5,407,313 | A | | 4/1995 | Bruins et al. |
| 5,478,051 | A | * | 12/1995 | Mauer .................... 264/156 |
| 5,931,622 | A | * | 8/1999 | Gupta et al. ............. 411/443 |
| 5,934,504 | A | * | 8/1999 | Elliott .................... 221/232 |
| 5,947,362 | A | | 9/1999 | Omli |
| 5,967,316 | A | * | 10/1999 | Abbruzzese et al. ........ 206/343 |
| 6,478,209 | B1 | | 11/2002 | Bruins et al. |
| 6,494,322 | B1 | * | 12/2002 | Habermehl et al. ......... 206/347 |

FOREIGN PATENT DOCUMENTS

WO  WO 99/39878  8/1999

OTHER PUBLICATIONS

National Nail Corp. Brochure depicting Plasti-Tacker Pro Fastening System, with elongated strips of nailing caps, 1998 (2 pages).

* cited by examiner

*Primary Examiner*—Flemming Saether
(74) *Attorney, Agent, or Firm*—Flynn, Thiel, Boutell & Tanis, P.C.

(57) ABSTRACT

A process for forming an elongate strip defined by a plurality of adjacent but sidewardly spaced pressure caps used for securing an underlayment to a substrate. A plurality of essentially identical strip segments, each containing a plurality of substantially identical pressure caps disposed in sidewardly spaced relationship along a row, are molded of a plastics material, with the endmost cap of each strip being molded with an outwardly cantilevered securing tab. A plurality of strip segments, after removal from the mold, are positioned in adjacent end-to-end relationship and the connecting tab on the end of one strip is mechanically joined to the endmost cap associated with a second strip, with a plurality of such strips being joined in aligned end-to-end relationship to define the elongate strip, which strip can be suitably packaged as a coil. The pressure cap preferably has an elongate recess which opens downwardly from the upper surface thereof to accommodate its engagement with a staple for securement to the substructure.

6 Claims, 4 Drawing Sheets

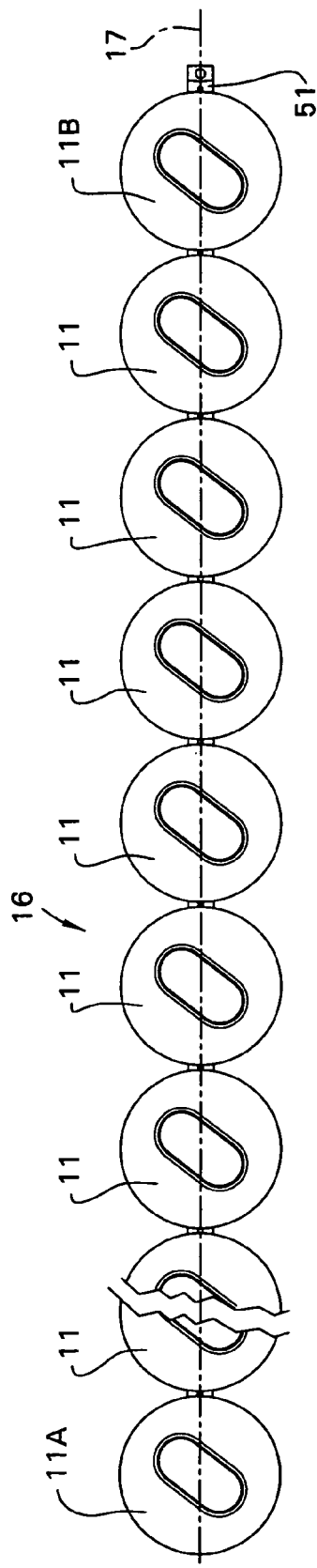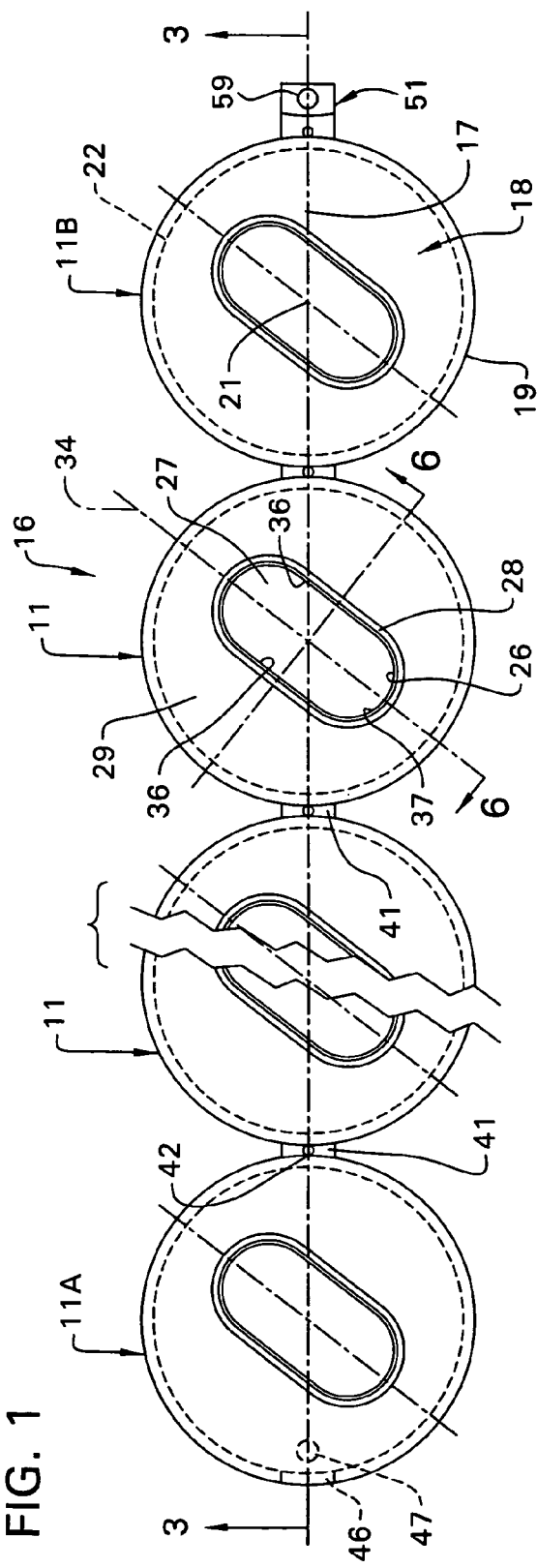

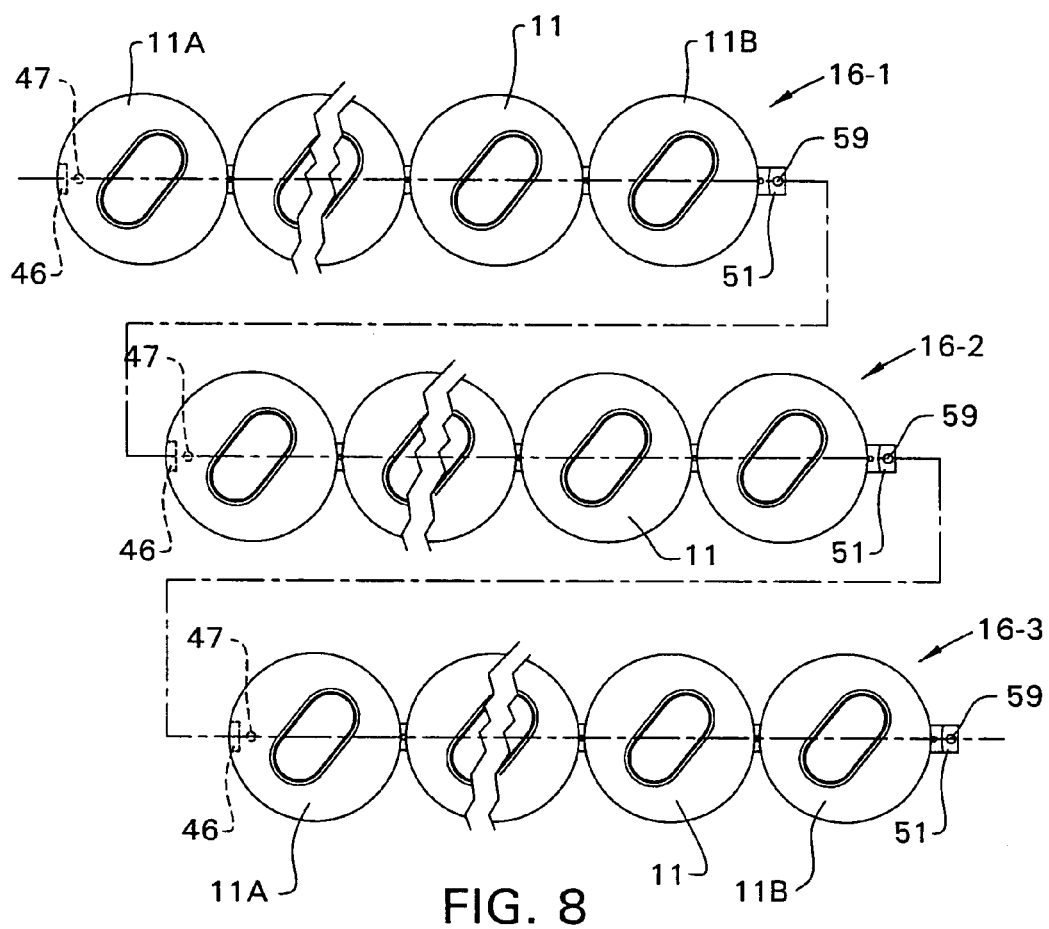
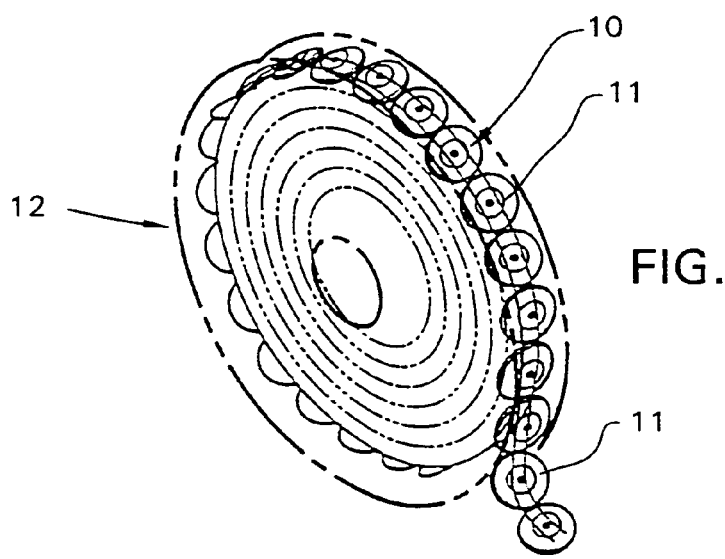
FIG. 8
FIG. 9

PROCESS FOR FORMING ELONGATED FLEXIBLE STRIP OF NAILING CAPS

FIELD OF THE INVENTION

This invention relates to plastic pressure plates, often referred to as plastic caps, as used in conjunction with fasteners for securing flexible sheeting such as roofing felt to a roof substrate. More specifically, this invention relates to an improved process for forming an elongate strip containing a large number of adjacent plastic caps joined together through a breakable web for use in a nail or staple driving device. The invention also relates to an improved plastic cap specifically for improved performance when used in conjunction with a staple as a fastener.

BACKGROUND OF THE INVENTION

The securement of an underlayment such as roofing felt or the like to a roofing substrate has, for many years, utilized fasteners which incorporate a disk or cap surrounding the shank of the nail, directly below the nail head, for providing improved gripping engagement with the underlayment to minimize tearing of the underlayment at the point of engagement with the nail. The cap (sometimes referred to as a pressure plate) associated with the nail is sometimes constructed of metal, although more frequently is constructed of plastic. One example of such cap is illustrated by U.S. Pat. No. 5,407,313 owned by the Assignee hereof. The use of a plastic cap in conjunction with a securing nail has provided significantly improved gripping performance with respect to securement of the underlayment to the substrate. Such fasteners, often referred to as cap nails, have encountered user resistance, however, since they are not suitable for use with conventional powered nailing systems.

In an effort to improve on the above, the Assignee has developed a powered nailing device which feeds not only nails but also plastic caps so as to permit the nail to be driven through the cap during use of the device, and hence greatly improve the speed with which cap nails can be used for securing an underlayment. In such device, a large plurality (such as several hundred) of plastic caps are joined together in adjacent side-by-side relationship to define an elongate strip, which strip is formed into a spiral coil and is supported on the nailing device for feeding caps to the nailing zone. The strip of caps, in this prior development, utilizes an elongate adhesive tape for joining the caps together, which tape is broken or severed between adjacent caps during the nailing operation. While use of adhesive tape for creating the strip provides a desirable operational arrangement, nevertheless using tape for forming the strip is somewhat difficult and in-efficient. Also, the tape has a tendency to stick to other objects.

Another known powered cap nailing device is illustrated by U.S. Pat. No. 5,947,362, which device also utilizes an elongate strip of joined plastic caps formed into a spiral coil, in conjunction with a separate nail magazine, so that the caps and nails are fed into a nailing zone for permitting the nail to pierce the cap during a nailing operation. The coiled strip of caps associated with the nailing device of the U.S. Pat. No. 5,947,362 joins adjacent caps of the strip utilizing a small plastic web extending between the peripheries of adjacent caps, which web is severed during the nailing operation. However, the process associated with the forming of this strip is less than desirable.

More specifically, the elongate cap strip of the type disclosed in the U.S. Pat. No. 5,947,362 is believed formed from a plurality of molded strip segments which each contain a plurality of caps disposed in aligned side-by-side relationship. The mold for forming the strip segment has a number of full size cavities corresponding to the number of caps in the strip segment, and at one end has a partial cavity which forms only a partial cap. After the strip segment has been molded, resulting in a partial cap or plug at one end of the strip, the mold is then opened and the strip segment is advanced so that the partial cap at one end of the strip is then positioned in the cap cavity disposed at the other end of the mold cavity. The mold is then closed and a further injection cycle is carried out, which results in injection of additional material around the partial cap so as to permit formation of a complete cap at one end of the mold cavity, and an additional partial cap is formed at the other end of the molded strip segment. This sequential molding and joining process then continues so that a significant number of strip segments are joined together to define the elongate strip, which can then be suitably packaged, such as wound into a spiral coil. With this arrangement, however, it has been observed that the cap formed in the end cavity in which the partial cap is positioned and overmolded results in problems such as flash around the cavity, as well as surface defects and disfiguration due to the overmolding involved. In addition, inasmuch as one strip segment is almost immediately removed from the mold and then joined to the next molded strip segment, this hence requires additional cooling and hence additional time in order to accomplish the molding of each strip segment, and also requires handling of the strip segments prior to their having adequately cooled, whereby such handling is more difficult and the strip segments are more susceptable to damage. This process also requires additional space and equipment, as well as handling, inasmuch as the strip segments are immediately and sequentially joined together to define the strip as the individual segments are sequentially molded.

In addition to the use of pressure caps for nails as disclosed above, the Assignee has also developed an automated stapling device which, in conjunction with a coiled strip of pressure caps, permits a stapling system to be used for securing the underlayment to the roof substrate, while at the same time utilizing a pressure cap in conjunction with a staple so as to provide improved securement performance. Such device is illustrated in U.S. Pat. No. 6,478,209, owned by the Assignee hereof. This device utilizes plastic caps which are generally similar to those utilized for nails, and while the legs of the staple do successfully penetrate the cap so as to permit securement to the roof substrate, nevertheless it is believed that improved performance can be achieved by providing a modified plastic cap for use specifically with staples.

Accordingly, it is an object of this invention to provide an improved process for creating an elongate strip of interconnected plastic roof securement caps, which strip can be suitably coiled, and which process overcomes disadvantages associated with prior processes for creating such strips, as briefly discussed above.

More specifically, the present invention relates to an improved forming process wherein an elongate strip segment containing a significant number of sidewardly adjacent caps are simultaneously formed in a mold with adjacent caps being joined through a molded plastic web. The cap formed at one end of the strip segment has a small recess formed therein, and the cap formed at the other end of the strip segment has a web joined thereto which in turn joins to a small molded connector part. Several such strip segments can be simultaneously molded in a common mold. The strip segments are removed from the mold for cooling to permit a fast cycle time in the mold, and the cooled individual strip segments can, at any time thereafter, and at any desired location, be joined together to create an elongate strip of desired length. For the latter purpose the strip segments are generally aligned and the connecting part associated with one end of a first strip segment is interfitted into the recess associated with the other end of a second strip segment to create a fixed joining of adjacent strip segments in generally aligned relationship. In a preferred variation the connecting part on one strip segment, when fitted in the recess of the next strip segment, is sonically welded to create a permanent joinder of the aligned strip segments. The joined strip segments can then be suitably packaged, such as wound into a coil. The forming of the individual strip segments hence greatly facilitates cooling and subsequent handling, it also facilitates the securement of adjacent strip segments at remote or different locations if desired so as to facilitate intermediate storage or handling of the strip segments, it also permits the mold to be of minimal complexity while at the same time minimizing the mold cycle time, and it permits all of the caps to be uniformly formed of desired quality without encountering undesired or excessive flash or surface irregularities.

It is also an object of the invention to provide an improved plastic pressure cap configured specifically for use with a staple for permitting securement of an underlayment to a roofing substrate, which plastic cap and its cooperation with the staple is believed to provide improved performance with respect to the ability of the staple legs to properly penetrate the cap and effect desired securement with the substrate.

More specifically, the improved plastic cap for use with a staple incorporates a raised center part which, in a conventional manner, depresses downwardly when engaged with a staple for securement with the underlayment. The raised center portion of the pressure cap, however, has an elongate recess formed in the upper surface thereof, which recess opens downwardly and terminates in a generally flat bottom wall, with the height of the recess being such that the base of the staple can be wholly accommodated in the recess and not protrude thereabove when the staple and cap are secured to the substrate. The recess in the elongate direction will typically have a dimension which is at least about twice the recess width so that the staple, when applied by an automated device such as illustrated by Assignee's U.S. Pat. No. 6,478,209, can be readily positioned so as to extend down into the recess and penetrate the bottom wall thereof, thereby ensuring that the base of the staple will be properly disposed within the recess and hence the plastic wall surrounding the recess will effectively shelter the staple base from the overlying roof, particularly if the overlying roof is of metal.

Other objects and purposes of the invention will be apparent to persons familiar with constructions and processes related to the present invention upon reading the following specification and inspecting the accompanying drawings.

BRIEF DESCRIPTION OF THE DRAWINGS

FIG. 1 is a top view of an improved elongate strip segment containing a plurality of joined pressure caps disposed in sidewardly adjacent and aligned relationship.

FIG. 2 is an enlarged fragmentary view of a portion of the strip segment of FIG. 1.

FIG. 8 diagrammatically illustrates the lengthwise joining together of several segments to define a long cap strip.

FIG. 9 diagrammatically illustrates an elongate cap strip formed from a plurality of joined segments, which cap strip is spirally wound so as to form a coil.

Figure 3:
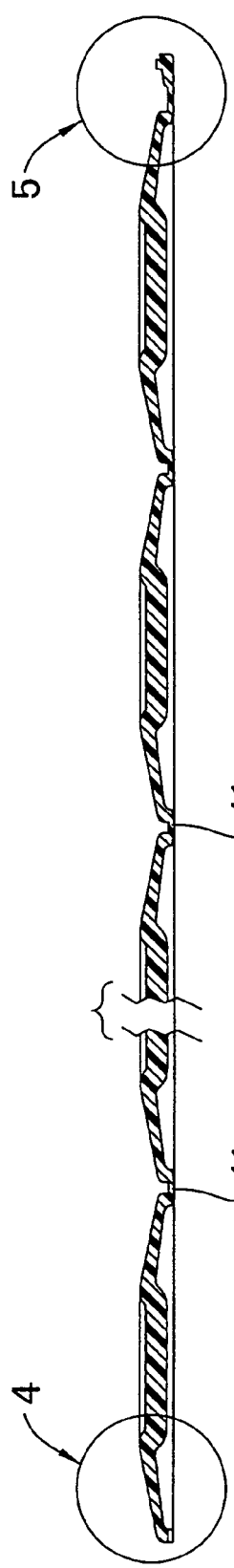
FIG. 3 is a cross-sectional view taken generally along line 3—3 in FIG. 2.
Figure 4:
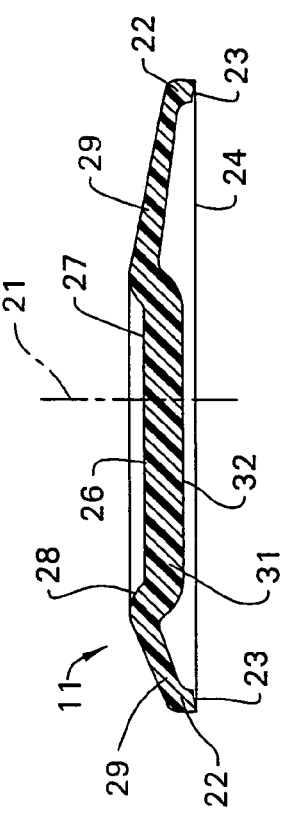
FIG. 4 is an enlargement of an edge portion of the cap at one end of the strip segment, namely that portion disposed within the circle designated 4 in FIG. 3.

Certain terminology will be used in the following description for convenience in reference only, and will not be limiting. For example, the words "upwardly", "downwardly", "rightwardly" and "leftwardly" will refer to directions in the drawings to which reference is made. The word "top" or "upper" will be used to refer to the side of the cap through which the fastener, such as a staple, is typically driven, this being the upper side illustrated in FIGS. 3–7, and the word "bottom" will be used to reference the opposite side of the cap, namely that side which engages the roof underlayment. Said terminology will include the words specifically mentioned, derivatives thereof, and words of similar import.

DETAILED DESCRIPTION

Referring to the drawings and specifically FIG. 9, there is illustrated an elongate cap strip 10 defined by a large plurality of substantially identical but individual pressure caps 11 which are intended for cooperation with a fastener, such as a nail or staple, to permit securement of an underlayment such as roofing felt to a roof substrate. The plurality of caps 11 are joined together in closely adjacent but spaced side-by-side relationship to define an elongate row, herein referred to as the strip 10. This strip 10 typically contains a large number of individual caps, such as between 200 and 500 caps depending upon the cap size and its cooperating tool. The cap strip 10 can be packaged in a manner suitable for use with a power tool, and in this respect the cap strip is typically spirally wound to form a coil 12 as diagrammatically illustrated in FIG. 9.

According to the present invention, the elongate cap strip 10 is formed from a plurality of individual molded strip segments 16 as illustrated by FIGS. 1 and 2. Each segment 16 is molded as a monolithic one-piece plastic member and includes a plurality of substantially identical caps 11 disposed in closely adjacent side-by-side relationship aligned generally along the longitudinal axis 17 of the strip segment 16. The number of caps utilized to define each segment 16 will vary depending on the cap size and on the capacity of the mold, although typically the segment will include a double-digit number of caps 11, and in the illustrated embodiment the cap strip segment 16 is designed to include 25 caps. A plurality of monolithic one-piece strip segments 16 are then joined serially together to define an elongate cap strip 10 as explained in greater detail hereinafter.

In the illustrated embodiment, each pressure cap 11 is molded of a plastics material, such as polyethylene, and is configured generally as a circular domed disk 18 having a diameter which is significantly greater than the axial thickness of the disk. The disk 18 has a generally circular outer periphery 19 as defined generally about a center axis 21.

The cap 11 at its outer diameter includes a generally annular rim or flange 22 which projects axially downwardly and defines thereon an annular bottom wall 23 adapted for creating contact with the underlayment positioned on the roof substrate. This bottom wall 23 will typically be slightly sloped upwardly as it projects radially inwardly so as to facilitate downward flexing of the center portion of the cap when a fastener, such as a staple, is driven therethrough for fixed securement to the roof substrate. The bottom wall 23 of the cap rim 22 substantially defines the bottom plane 24 of the cap when the latter is in its nondeformed and hence nonloaded condition.

The circular disk 18 defining the cap 11 is generally domed axially upwardly a small extent relative to the surrounding annular rim 22, and in the center thereof is provided with a downwardly opening recess 26, the latter terminating in a generally flat wall 27 at the bottom of the recess. This flat wall 27 defines part of the upper surface of the cap, and the recess 26 is surrounded by an endless rim 28 which protrudes upwardly from around the flat wall 27. The rim 28 in turn joins to an annular wall portion 29 which projects radially outwardly and slopes downwardly for joinder to the surrounding annular rim 22. The uppermost extremity of the nondeformed or nonloaded cap is defined generally by the upper surface of the endless rim 28, which upper extremity is spaced a substantial distance above the recess floor 27 so that the recess 26 will have sufficient vertical height to accommodate a fastener therein, particularly the base wire of a staple, without the staple protruding upwardly beyond the upper extremity of the cap. For this purpose, the depth of the recess 26 will normally be at least about 0.020 inch.

Figure 6:
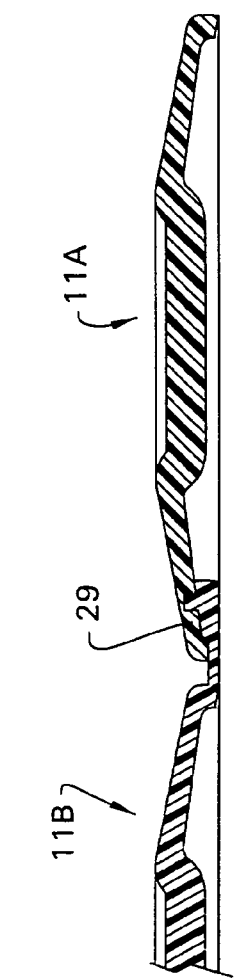
FIG. 6 is an enlarged cross-sectional view through a single pressure cap as taken along line 6—6 in FIG. 2.

As shown in FIG. 6, the principal center wall portion of the cap is defined by a top wall 31 which is typically of relatively uniform thickness as defined between the top surface 27 (this being the floor of the recess 26) and a bottom surface 32, the latter being spaced upwardly from the bottom plane 24 when the cap is in a nonloaded or nondeformed condition. The spacing between the plane 24 and the bottom surface 32 is typically significantly smaller than the thickness of the top wall portion 31, which latter wall portion 31 deflects downwardly and engages the roof underlayment when a staple penetrates the wall portion 31 for securing the cap to the roof substrate.

As is known, the annular wall portion 29 which joins radially between the center recess 26 and the annular outer rim 22 is preferably of decreasing axial thickness as the wall portion protrudes radially outwardly and slopes axially downwardly toward the rim 22 so as to enable the annular wall portion 29 to effectively flex, like a diagram, so that the center portion of the cap can flex downwardly to engage the underlayment when a fastener such as a staple is driven through the top wall portion 31.

The cap 11 in the present invention is desirably provided with the recess 26 elongated transversely relative to the center axis 21, which transverse elongation in the illustrated embodiment extends along an axis 34 which perpendicularly intersects the axis 21 and which also extends in transverse intersecting relationship to the longitudinal strip axis 17. In the illustrated embodiment this axis 34 extends in angled relationship with respect to the longitudinal axis 17 at an angle preferably in the range of 30° to 60° relative to the axis 17. The elongate shape of the recess 26 is such that the recess is defined between generally parallel sides 36 which are generally parallel with the axis 34 and disposed uniformly on opposite sides thereof, and opposite ends of the recess 26 are defined by generally semicircular concavely rounded ends 37. The recess 26 has a length, as measured generally along the axis 34 thereof, which preferably is at least twice the width of the recess as measured transversely between the parallel sides 36 thereof. This configuration of the recess 26 permits the cap to readily accept and accommodate a staple as a fastener, which staple can be positioned such that the legs of the staple readily penetrate the top wall portion 31 for engagement with the roof substrate, with the base of the staple being readily accommodated within the recess 26 so as to not protrude upwardly beyond the upper extremity of the cap. In this manner the staple hence will avoid contact with the roofing which overlies the cap, which is particularly desirable if the roofing constitutes metal sheet.

As illustrated by FIGS. 2 and 3, the monolithic one-piece strip segment 16 has the sidewardly adjacent but sidewardly spaced caps 11 integrally joined together by means of small but thin webs 41 which join to and protrude outwardly a small distance from the rim 22 substantially flush with the bottom surface thereof. Each adjacent pair of caps 11 is joined together through one of the webs 41, which webs 41 are aligned generally along the longitudinal centerline 17 of the strip segment so that each interior cap 11 of the strip segment connects on diametrically opposite sides thereof to a pair of webs 41 which in turn join to the pair of caps disposed on diametrically opposite sides of the intermediate cap. The web 41 is of small vertical thickness, typically approximately 0.030 inch, which thickness is substantially less than the thickness of the cap, whereby the web can be easily fractured when the cap strip is being utilized with its respective tool. The web 41 in the illustrated embodiment is also preferably provided with a small opening 42 therethrough generally along the lengthwise centerline 17 so that the web is effectively defined by a pair of smaller sidewardly-spaced strips so as to facilitate severing or fracturing of the web during use. The length of the web, as measured by the clearance between sidewardly adjacent caps, is also maintained at a minimum and will typically be in the range of 0.030 to 0.040 inch.

Considering now the cap designated 11A as provided at one end of the strip segment 16, the cap 11A is identical to the caps 11 except that cap 11A has a web 41 joined to only one diametral side thereof inasmuch as the cap 11A is the endmost cap of the strip segment. This cap 11A, however, on the side thereof diametrically opposite its connecting web 41, is provided with a small recess 46 opening radially through the thickness of the annular rim 22 generally along the longitudinal centerline 17, which recess 46 opens downwardly through the bottom wall of the rim. The width of the recess 46, as it extends circumferentially along the rim as viewed in FIG. 2, generally corresponds to or slightly exceeds the width of the web 41. The cap 11A also has a generally cylindrical opening (i.e., a blind bore) 47 opening upwardly from the bottom surface of the annular wall portion 29. The bore 47 is spaced inwardly a small distance from the recess 46, and is disposed to substantially transversely intersect the lengthwise centerline 17. This recess 46 and bore 47 are formed in the cap during molding thereof, and are utilized to permit strip segments 16 to be serially coupled together to define an elongate strip, as explained hereinafter.

Considering now the cap 11B defined at the other end of the strip segment 16, this end cap 11B is again identical to the caps 11 except that it joins to an adjacent cap 11 through a web 41 on only one diametral side thereof. The cap 11B is also provided with a connecting tab 51 cantilevered outwardly from the rim thereof. This connecting tab 51 is cantilevered outwardly generally along the longitudinal centerline 17 so as to be integrally joined to the end cap 11B at the side thereof which is diametrically opposite from the connecting web 41 which joins to the adjacent cap 11.

Figure 5:
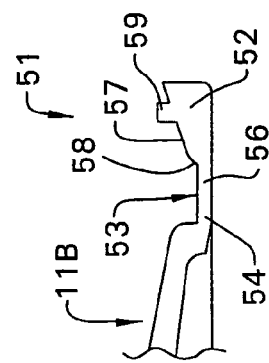
FIG. 5 is an enlargement showing the other end of the strip segment, namely that portion disposed within the circle designated 5 in FIG. 3.

As illustrated by FIG. 5, the connecting tab 51 at the outer or free end thereof includes a connecting block 52 which connects to the rim of the cap 11B through a thin web 53, the latter joining to the edge of the cap rim and having a width and thickness generally corresponding to the web 41. The web 53 is cantilevered outwardly from the cap rim through a greater extent, and includes an inner end part 54 which joins to the cap rim and which generally identically corresponds to the web 41 as described above. This web part 54 in turn joins to an outer web part 56 which in turn joins to the connecting block 52. The web part 56 is sized so as to easily fit into and pass through the recess 46 associated with the end cap 11A of an adjacent strip segment 16.

The connecting block 52, as illustrated by FIG. 5, has an upper surface 57 which angles or slopes downwardly as it projects inwardly from the outer free end thereof, which surface terminates at a small shoulder 58 which defines the transition between the sloped surface 57 and the web 53. The sloped surface 57 is angled so as to generally conform with the slope defined on the bottom surface of the end cap 11A directly adjacent but inwardly of the recess 46.

The connecting block also has a protrusion 59 projecting upwardly in cantilevered relation from the upper surface 57 thereto. The protrusion 59 in the illustrated embodiment is formed generally as a cylindrical pin which is sized so as to project upwardly into the opening 47 in an end cap 11A so as to create a snug fit of the pin 59 into an opening 47 to thus create an accurate end-to-end joining together of a pair of strip segments. This engagement of pin 59 into opening 47 thus provides positional accuracy with respect to both sideward and lengthwise positioning of serially joined strip segments, and maintains desired alignment.

Figure 7:
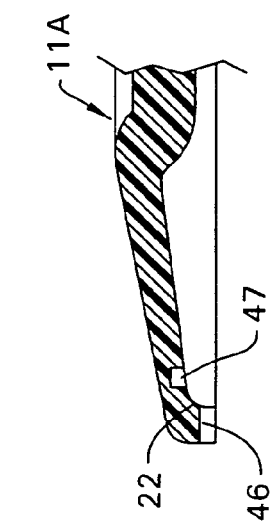
FIG. 7 is an enlarged, fragmentary longitudinal sectional view illustrating the manner in which adjacent ends of two strip segments are joined together to create an elongate strip of caps.

To join two monolithic cap strip segments 16 together, the two cap strip segments are disposed generally in aligned relationship (as illustrated in FIG. 8) so that the end cap 11A on one segment is adjacent and aligned with the end cap 11B of the other segment. When so positioned, then the connecting tab 51 is positioned such that, as illustrated by FIG. 7, the web part 56 is disposed within the recess 46 associated with the end cap 11B, and the connecting block 52 is seated directly under the sloped wall portion of the end cap 11A, with the proper positioning being ensured by the pin 59 being snugly fitted in the opening 47. In this position, the shoulder 58 also substantially abuts against the annular rim 22. When so positioned, then the block part 52 on the end cap 11B is non-separably fixedly secured to the top wall of the end cap 11A by a suitable means, preferably sonic welding, which creates a weld between the block part 52 and the annular wall portion 29 of the end cap 11A.

Alternatively, the sonic welding can be replaced by other securing means, such as adhesives, or preferably by means of a mechanical interlock, such as a snap or pressure fit between the connecting tab and its engagement with the end cap 11A. For example, the engagement of pin 59 into opening 47 could be used to create a fixed joining of the tab to the cap 11A, such as by an interference fit therebetween.

Utilizing the interconnecting technique described above, a series of premolded monolithic cap strip segments 16 can be sequentially serially aligned and joined together, with the number of joined cap strip segments being a function of the number of caps defined in each strip segment together with the desired size and number of caps (typically a triple digit number) in the overall strip. The completed strip can then be suitably packaged or shaped, such as by being wound spirally to create a coil. The winding of the strip to form a coil can also be carried out substantially simultaneous with the sequential serial securement of the cap strip segments so as to define the strip.

Once the strip of desired length has been completed, then the protruding connecting tab 51 associated with one end of the strip is removed so as to permit completion of the strip.

Figure 10:
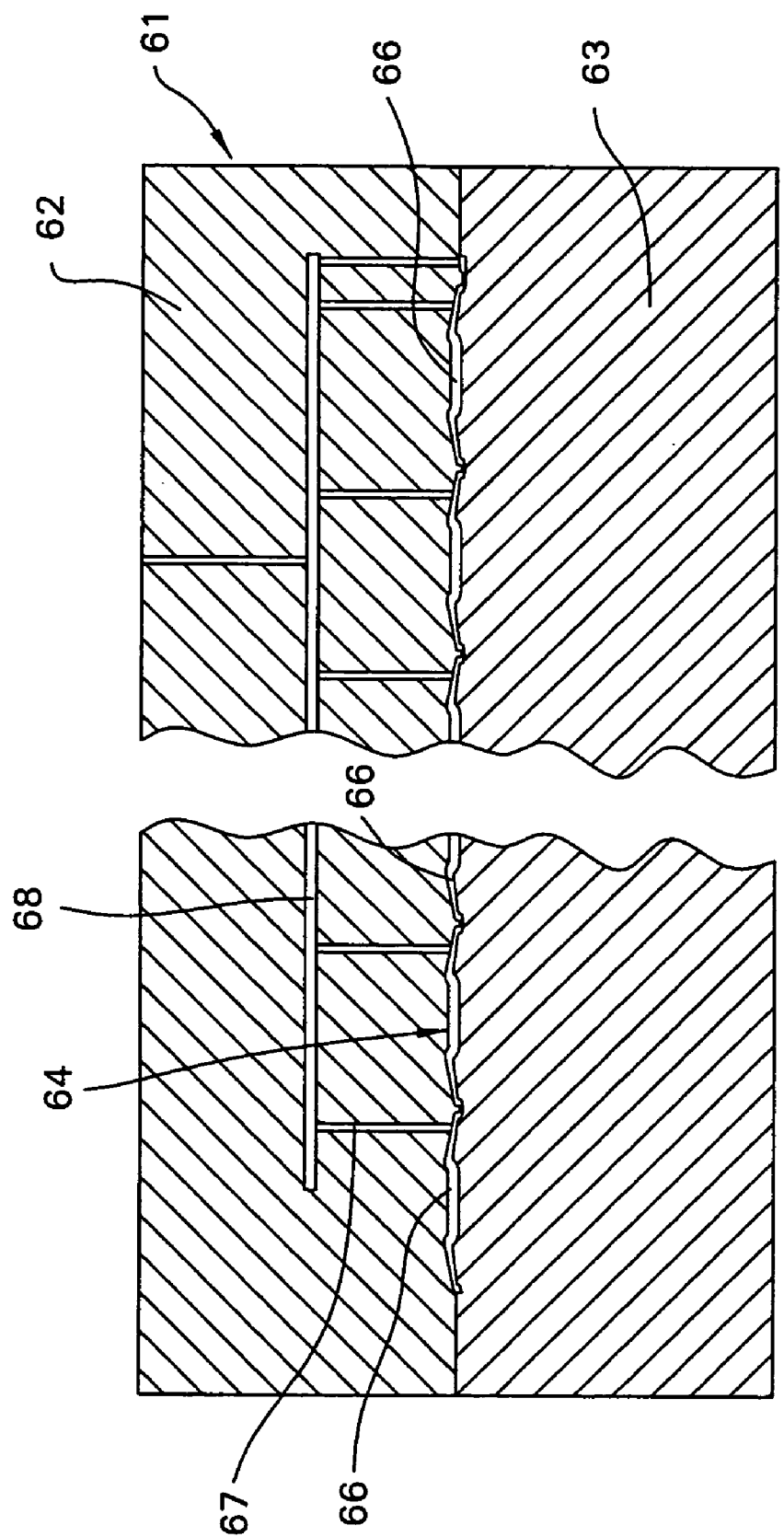
FIG. 10 is a fragmentary cross-sectional view which diagrammatically illustrates a mold for permitting forming of a cap strip segment according to the present invention.

Referencing now FIG. 10, there is diagrammatically illustrated a mold for permitting molding of the strip segment 16 from a suitable plastics material. The mold 61 is only diagrammatically illustrated and includes separable upper and lower mold parts 62 and 63 which define a suitable mold cavity 64 therebetween which defines the shape of the cap strip segment 16. The mold cavity 64 includes a plurality of subcavities 66, each corresponding to the shape of the caps 11 as well as the end caps 11A and 11B, with the cavity for the end cap 11B communicating with a cavity corresponding to the connecting tab 51. The subcavities 66 are also suitably joined through aligned small passages which form the webs 41. Each of the subcavities is supplied with molten plastic through a suitable supply gate 67, which in turn communicates with a suitable supply runner 68, whereby the supplying of molten plastic into the mold cavity permits formation of the monolithic one-piece cap strip segment 16. The segment is formed by injecting molten plastic into the cavity of the closed mold, following which the mold is opened to permit removing of the strip segment. The strip segment can be removed from the mold cavity while still in a fairly warm or hot condition, and then positioned on a suitable cooling shelf or tray. The mold is preferably designed to include several separate but identical mold cavities therein to permit the simultaneous molding of several cap strip segments, all of which can be removed following molding and opening of the mold, with the molded strips being suitably cooled and moved or transported as desired to any suitable location so as to permit the subsequent serial connecting of the strip segments so as to define a much longer completed cap strip of desired length.

While the cap 11 illustrated in the present invention has an elongate recess 26 therein particularly for utilization with a staple as a fastener, it will be appreciated that the process for forming the cap strip of the present invention can also be utilized for forming cap strips wherein the individual caps have a generally round or circular recess therein for accommodating a nail head. The provision of such circular recess is conventional.

While the pressure cap of the present invention is disclosed principally for securing an underlayment to a roof substructure, it will be appreciated that the cap when used with fasteners such as staples or nails can also be used in other construction environments, such as for securing thin and/or flexible materials to substrates associated with building side walls and the like.

While the aforementioned description has utilized the term "cap" or "pressure cap", it will be recognized that the use of this term is for convenience in description, and that such member is also sometimes referred to as a pressure plate or a pressure washer, and as such these alternate terminologies or other equivalent terminologies are encompassed within the description of the invention as presented herein.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A process for forming an elongate cap strip containing a large number of plastic pressure caps disposed in adjacent side-by-side relation and joined together by thin breakable plastic webs, comprising the steps of:

providing a mold defining therein at least one elongate mold cavity for forming an elongate cap strip segment containing a plurality of caps disposed in adjacent but spaced side-by-side relation along a row extending in a lengthwise direction of the strip segment;

providing said mold cavity with a plurality of substantially identical subcavities each shaped to define a single cap, said subcavities being disposed in closely adjacent but spaced side-by-side relationship along a lengthwise-extending row;

providing said mold cavity with thin web-creating passages in the lengthwise direction of said row and providing communication between peripheries of each adjacent pair of subcavities;

providing said mold cavity with a tab-forming cavity joined to one of said subcavities as defined at one end of said row, said tab-forming cavity projecting outwardly in said lengthwise direction away from said one end subcavity, said tab-forming cavity at its outer free end being defined by a cavity portion which joins to one end of a thin web-defining passage which extends in said lengthwise direction and which at its other end communicates with a periphery of said one end subcavity;

injecting molten plastic into and filling said mold cavity to define a one-piece monolithic cap strip segment having a predefined number of adjacent but sidewardly spaced plastic caps disposed in a row and corresponding to the number of subcavities defined in the mold cavity, and each sidewardly adjacent pair of caps being joined by a thin plastic web, said plurality of caps including first and second end caps respectively defined at opposite ends of said row, and said first end cap being joined to a connecting tab which is cantilevered outwardly from said first end cap in said lengthwise direction;

removing said molded one-piece monolithic strip segment, in its entirety, from said mold;

then positioning a pair of substantially identical said strip segments, after removal thereof from the mold, in adjacent end-to-end relationship so that the first end cap having the connecting tab joined thereto as associated with one said strip segment is positioned in adjacent relationship to the second end cap associated with said other strip segment; and engaging the connecting tab associated with the first end cap of said one strip segment with the second end cap of said other strip segment and creating a fixed securement therebetween so that said pair of strip segments define an elongate strip having a large plurality of said caps disposed in uniformly interconnected but sidewardly spaced relationship therealong;

providing the subcavity which defines the other end of said row with structure which creates a recess in the peripheral wall of the cap defined in said other end cavity, and the connecting tab associated with said one strip segment being engaged within the recess associated with the other end cap of said other strip segment for allowing fixed serial connection between said pair of strip segments.

2. A process according to claim 1, wherein the connecting tab associated with the cap located at one end of said one strip segment is sonically welded to the cap defined at the other end of said other strip segment.

3. A process according to claim 1, wherein the step of engaging the connecting tab associated with the first end cap of said one strip segment with the second end cap of said other strip segment results in a connection between the first end cap and the second end cap that is substantially identical to each said thin plastic web joining adjacent ones of said plurality of caps.

4. A process for forming an elongate cap strip containing a large number of plastic pressure caps disposed in adjacent side-by-side relation and joined together by thin breakable plastic webs, comprising the steps of:

providing a mold defining therein at least one elongate mold cavity for forming an elongate cap strip segment containing a plurality of caps disposed in adjacent but spaced side-by-side relation along a row extending in a lengthwise direction of the strip segment;

providing said mold cavity with a plurality of substantially identical subcavities each shaped to define a single cap, said subcavities being disposed in closely adjacent but spaced side-by-side relationship along a lengthwise-extending row;

providing said mold cavity with thin web-creating passages to provide communication between peripheries of each adjacent pair of subcavities;

providing said mold cavity with a tab-forming cavity joined to one of said subcavities as defined at one end of said row, said tab-forming cavity projecting outwardly in said lengthwise direction away from said one end subcavity;

providing the subcavity at the other end of said row with a recess forming structure;

injecting molten plastic into and filling said mold cavity to define a one-piece monolithic cap strip segment having a predefined number of adjacent but sidewardly spaced plastic caps disposed in a row and corresponding to the number of subcavities defined in the mold cavity, and each sidewardly adjacent pair of caps being joined by a thin plastic web, said plurality of caps including first and second end caps respectively defined at opposite ends of said row, said first end cap being joined to a connecting tab which is cantilevered outwardly from said first end cap in said lengthwise direction and said second end cap having a recess formed therein;

removing said molded one-piece monolithic strip segment, in its entirety, from said mold;

then positioning a pair of substantially identical said strip segments, after removal thereof from the mold, in adjacent end-to-end relationship so that the first end cap having the connecting tab joined thereto as associated with one said strip segment is positioned adjacent to the second end cap associated with said other strip segment; and engaging the connecting tab associated with the first end cap of said one strip segment within the recess of the second end cap of said other strip segment to fixedly and serially connect said pair of strip segments to define an elongate strip having a large plurality of said caps disposed in uniformly interconnected but sidewardly spaced relationship therealong.

5. A process according to claim 4, wherein the connecting tab associated with the first end cap located at one end of said one strip segment is welded to the second end cap defined at the other end of said other strip segment.

6. A process according to claim 4, wherein the connecting tab associated with the first end cap located at one end of said one strip segment is sonically welded to the second end cap defined at the other end of said other strip segment.

* * * * *